US011816547B2

United States Patent
Li et al.

(10) Patent No.: US 11,816,547 B2
(45) Date of Patent: Nov. 14, 2023

(54) CALIBRATION METHOD AND APPARATUS, TERMINAL DEVICE, AND STORAGE MEDIUM

(71) Applicant: LYNXI TECHNOLOGIES CO., LTD., Beijing (CN)

(72) Inventors: Han Li, Beijing (CN); Yaolong Zhu, Beijing (CN)

(73) Assignee: LYNXI TECHNOLOGIES CO., LTD., Beijing (CN)

( * ) Notice: Subject to any disclaimer, the term of this patent is extended or adjusted under 35 U.S.C. 154(b) by 0 days.

(21) Appl. No.: 18/004,021

(22) PCT Filed: Jul. 23, 2021

(86) PCT No.: PCT/CN2021/108133
§ 371 (c)(1),
(2) Date: Dec. 30, 2022

(87) PCT Pub. No.: WO2022/022417
PCT Pub. Date: Feb. 3, 2022

(65) Prior Publication Data
US 2023/0196197 A1    Jun. 22, 2023

(30) Foreign Application Priority Data
Jul. 29, 2020    (CN) .......................... 202010747179.2

(51) Int. Cl.
*G06N 20/00*    (2019.01)
(52) U.S. Cl.
CPC .................... *G06N 20/00* (2019.01)
(58) Field of Classification Search
None
See application file for complete search history.

(56) References Cited

U.S. PATENT DOCUMENTS

2022/0101133 A1*   3/2022   Ardywibowo ......... G06N 3/045

FOREIGN PATENT DOCUMENTS

| CN | 110058943 A | * | 7/2019 | ........... G06F 9/5016 |
|----|-------------|---|--------|------------------------|
| CN | 110058943 A |   | 7/2019 |                        |

(Continued)

OTHER PUBLICATIONS

Chen S, Wang W, Pan SJ. Deep neural network quantization via layer-wise optimization using limited training data. In Proceedings of the AAAI Conference on Artificial Intelligence Jul. 17, 2019 (vol. 33, No. 01, pp. 3329-3336). (Year: 2019).*

*Primary Examiner* — Vincent Gonzales
(74) *Attorney, Agent, or Firm* — Browdy and Neimark, PLLC

(57) ABSTRACT

A calibration method, a calibration apparatus, a terminal device and a storage medium are provided. The method comprises the following steps: determining layer attribute information of each to-be-calibrated layer in a model (S110); and determining the group in which each of the to-be-calibrated layers is located according to the total available resources and the layer attribute information of each of the to-be-calibrated layers (S120). The layer attribute information of any of the to-be-calibrated layers comprises layer required resources, the layer required resources are resources needing to be occupied when the to-be-calibrated layer is calibrated; and the total available resources are the total resources used for calibration. By means of the method, all of to-be-calibrated layers can be reasonably grouped on the premise that the total available resources can provide support, so that the layer required resources in each calibration operation are balanced and large as much as possible, thereby making full use of resources. Moreover, the number of calibration operations is reduced, and the calculation speed during the calibration of a model is increased.

7 Claims, 3 Drawing Sheets

(56) References Cited

FOREIGN PATENT DOCUMENTS

| | | |
|---|---|---|
| CN | 110389824 A | 10/2019 |
| CN | 110738316 A | 1/2020 |
| CN | 111915017 A | 11/2020 |
| EP | 3382989 A1 | 10/2018 |
| WO | 2020093306 A1 | 5/2020 |

* cited by examiner

CALIBRATION METHOD AND APPARATUS, TERMINAL DEVICE, AND STORAGE MEDIUM

CROSS-REFERENCE TO RELATED APPLICATIONS

The present application is a National Phase Application filed under 35 U.S.C. 371 as a national stage of PCT/CN2021/1108133, filed on Jul. 23, 2021, an application claiming priority from Chinese Patent Application No. 202010747179.2, filed on Jul. 29, 2020 in the Chinese Intellectual Property Office, contents of which are hereby incorporated herein by reference in their entirety.

FIELD OF TECHNOLOGY

The present invention relates to the technical field of data processing, and in particular relates to a calibration method, a calibration apparatus, a terminal device, and a computer readable storage medium.

BACKGROUND

Model quantization is a common technique in the field of deep learning, which may increase the speed of model operations and reduce model size by quantizing model parameters and inputs from high precision to low precision, e.g., from float32 (floating point 32 bits) to int8 (integer 8 bits).

To reduce the precision loss during model quantization, the model needs to be calibrated, i.e., typical application data is input into the model (model-based reasoning) to obtain the dynamic range of the data generated by each to-be-calibrated layer (which can be specified by the user) and needing to be quantized, and then the quantization factor is determined based on such dynamic range (statistics calculation). While the quantization factor is configured for quantization.

Deep learning techniques are computationally intensive for the model, the data generated by each layer has large dimensions (large tensor and large size), and more memory is required to calibrate the data, but the calibration apparatus is limited in memory and thus cannot calibrate all the to-be-calibrated layers at once. In the current calibration algorithm, all to-be-calibrated layers of the model are usually calibrated in sequence according to according to a data transmission direction in the model, and one layer or a plurality of adjacent layers are fixedly calibrated each time.

However, different to-be-calibrated layers require different memories during calibration, which may cause the memory required by the to-be-calibrated layers in part of calibration operations to approach to the upper limit of the calibration apparatus. Moreover, the memory required by the to-be-calibrated layers in other calibration operations is too small to make full use of the resources of the calibration apparatus, leading to a high number of calibrations and a long time for calibration.

SUMMARY

An embodiment of the present invention provides a calibration method, a calibration apparatus, a terminal device, and a computer readable storage medium. The speed during model calibration is improved.

In a first aspect, the embodiment of the present invention provides a calibration method, including: determining layer attribute information of each to-be-calibrated layer in a model; and determining a group in which each of the to-be-calibrated layers is located according to the total available resources and the layer attribute information of each of the to-be-calibrated layers; wherein the layer attribute information of any of the to-be-calibrated layers comprises layer required resources, the layer required resources being resources needing to be occupied when the to-be-calibrated layer is calibrated; and the total available resources are the total resources used for calibration.

In some embodiments, the determining a group in which each of the to-be-calibrated layers is located according to the total available resources and the layer attribute information of each of the to-be-calibrated layers includes: determining the to-be-calibrated layer with the greatest layer required resources as a target layer from the to-be-calibrated layers not in a group; determining a group in which the target layer is located at least according to the layer attribute information of the target layer; subtracting the layer required resources of the target layer from the group available resources of the group in which the target layer is located; and if there are still to-be-calibrated layers not in a group, returning to the step of determining the to-be-calibrated layer with the greatest layer required resources as a target layer from the to-be-calibrated layers not in a group.

In some embodiments, the determining the group in which the target layer is located at least according to the layer attribute information of the target layer includes: if there are groups with the group available resources greater than or equal to the layer required resources of the target layer, selecting one of the groups as the group in which the target layer is located; if there is no group with the group available resources greater than or equal to the layer required resources of the target layer, creating one group, determining the group as the group in which the target layer is located, and setting the group available resources of the group to be equal to the total available resources.

In some embodiments, the selecting one of the groups as the group in which the target layer is located if there are groups with the group available resources greater than or equal to the layer required resources of the target layer includes: determining a group with the least cost value from the groups with the group available resources greater than or equal to the layer required resources of the target layer as the group in which the target layer is located, wherein the cost value of any of the groups is a difference value between a first time and a second time of the group, the first time being the time required for calibrating all to-be-calibrated layers and the target layer in the group, and the second time being the time required for calibrating all the to-be-calibrated layers in the group.

In some embodiments, the determining the group with the least cost value from the groups with the group available resources greater than or equal to the layer required resources of the target layer as the group in which the target layer is located includes: determining the maximum sequence number of each group; the maximum sequence number of any of the groups being the maximum value of the sequence numbers of all to-be-calibrated layers in the group, and the sequence number of any of the to-be-calibrated layers being the order of the to-be-calibrated layer in the model according to the preset processing sequence; if there are groups with the maximum sequence numbers greater than that of the target layer, selecting one of the groups as the group in which the target layer is located; and if there is no group with the maximum sequence number greater than that of the target layer, determining the group with the highest value of the maximum sequence number as the group in which the target layer is located.

In some embodiments, the resources are memory resources.

In some embodiments, after determining the group in which each of the to-be-calibrated layers is located according to the total available resources and the layer attribute information of each of the to-be-calibrated layers, the method further includes: selecting one group that is not calibrated, and calibrating all to-be-calibrated layers in the group; if there are still groups that are not calibrated, returning to the step of selecting one of groups that is not calibrated, and calibrating all to-be-calibrated layers in the group.

In a second aspect, the embodiment of the present invention provides a calibration apparatus, including a first determination module, configured to determine layer attribute information of each of to-be-calibrated layers in a model; and a second determination module, configured to determine a group in which each of the to-be-calibrated layers is located according to the total available resources and the layer attribute information of each of the to-be-calibrated layers.

In a third aspect, the embodiment of the present invention provides a terminal device, including: one or more processors; a storage apparatus, configured to store one or more programs, wherein the one or more programs, when executed by the one or more processors, enable the one or more processors to implement any of the calibration methods provided by the embodiments of the present invention.

In a fourth aspect, the embodiment of the present invention provides a computer readable storage medium having computer programs stored thereon, wherein the computer programs, when executed by the processors, are configured to implement any of the calibration methods provided by the embodiments of the present invention.

DESCRIPTION OF THE EMBODIMENTS

Figure 1:
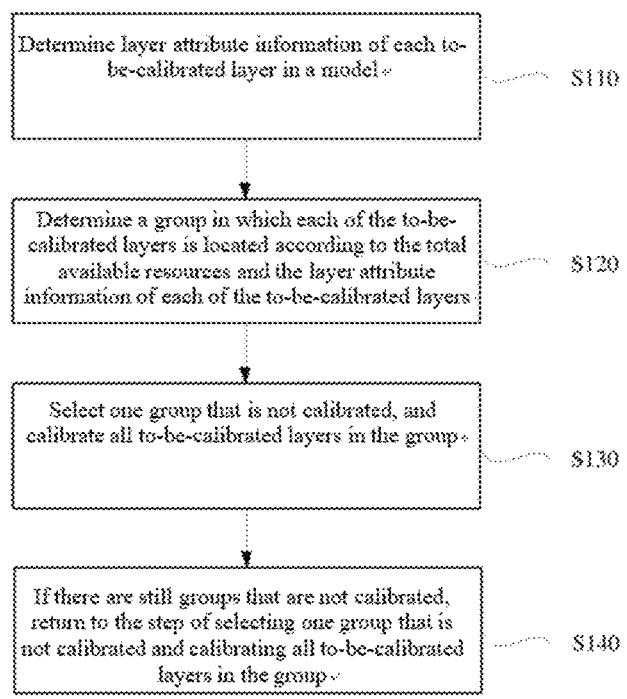
FIG. 1 is a flowchart of a calibration method in accordance with an embodiment of the present invention.

The present invention is further described in detail below with reference to accompanying drawings and embodiments. It should be appreciated that the specific embodiments described herein are merely used for explaining the present invention rather than limiting the present invention. In addition, it should also be noted that for the ease of description, the accompanying drawings merely show the part related to the present disclosure rather than all the content.

Before exemplary embodiments are described in further detail below, it should be noted that some exemplary embodiments are described as processing or methods depicted by flow charts. Although various operations (or steps) are described as sequential processing in the flow charts, some of the operations may be implemented in parallel, concurrently, or simultaneously. In addition, the order of the operations may be rearranged. The processing may be terminated when the corresponding operation is completed. However, the processing may further include additional steps that are not shown in the accompanying drawings. The processing may correspond to a method, function, procedure, subroutine, subprogram, and so on. In the case without conflict, the embodiments in the present invention and the features in the embodiments may be combined with each other.

As used herein, the term "include" and its variants are open-ended, that is, "including, but not limited to". The term "based on" is "based at least in part on". The term "one embodiment" denotes "at least one embodiment".

It should be noted that the concepts of "first" and "second" mentioned in the present invention are only used to distinguish the corresponding content rather than defining the order or interdependence.

It should be noted that the modifications of "a" and "a plurality" mentioned in the present invention are illustrative rather than restrictive, and those skilled in the art should understand that, unless the context clearly indicates otherwise, "a" and "a plurality" should be understood as "one or a plurality of".

In a first aspect, the embodiment of the present invention provides a calibration method.

The calibration method in accordance with the embodiment of the present invention may be applied to a model quantization scenario. That is, the calibration method is configured to calibrate to-be-calibrated layers in a model to obtain quantization factors for the to-be-calibrated layers, and the quantization factors may be configured to achieve model quantization.

The calibration method in accordance with the embodiment of the present invention may be executed by a calibration apparatus. The calibration apparatus may be implemented with software and/or hardware, and is generally integrated on a terminal device. The terminal device in the embodiment of the present disclosure includes, but is not limited to, mobile phones, computers, personal digital assistants and other devices.

The model is any operational model established according to deep learning technology, such as a neural network model. Each model may deal with certain problems, such as image recognition, and voice recognition. While each model comprises a plurality of layers arranged in sequence. Each layer may perform a certain processing (e.g., convolutional processing, full connection processing, etc.) on the data entering therein (e.g., data input into the model, or the data output by the previous layer), and then output the resulting data backwards (e.g., to the next layer, or from the model).

The to-be-calibrated layer is a layer needing to be calibrated (to obtain quantization factors) in the model, which may be all or some of layers in the model. The to-be-calibrated layer may be determined by means of user designation, etc., and the present invention is not limited to it.

FIG. 1 is a flowchart of a calibration method in accordance with an embodiment of the present invention. The calibration method includes the following steps S110 to S120.

S110. Layer attribute information of each to-be-calibrated layer in a model is determined.

The layer attribute information of any of the to-be-calibrated layers include layer required resources, and the layer required resources are resources needing to be occupied when calibrating the to-be-calibrated layer.

In this step, the layer attribute information of each to-be-calibrated layer is firstly determined, without limiting the specific determination means. For example, the layer attribute information can be determined based on the configuration of the to-be-calibrated layer (e.g., the size of input data, the size of a convolution kernel, the moving step length, the parameter of a function, etc.).

The layer attribute information at least includes the layer required resources, i.e., the resources for processing the data generated by the to-be-calibrated layer in the process of performing the calibration operation, namely, the resources that must be occupied by the to-be-calibrated layer in single calibration operation.

In some embodiments, the resources include the memory resource.

As a way of the embodiment of the present invention, all resources (the total available resources, the layer required resources, the group available resources, etc.) include at least the memory resource. Certainly, the resources above may also include other types of resources, such as the operational resources of the processor.

S120. A group in which each of the to-be-calibrated layers is located is determined according to the total available resources and the layer attribute information of each of the to-be-calibrated layers.

The total available resources are the total resources for calibration.

According to the total resources available in each calibration operation (the total available resources) and the resources required by the various to-be-calibrated layers when calibrated (the layer required resources), the various to-be-calibrated layers are divided into different groups. That is, in the calibration method in accordance with the embodiment of the present disclosure, before the calibration operation is actually performed, which layers should be calibrated in each calibration operation may be predetermined.

Therefore, the to-be-calibrated layers in each group may be calibrated in the same calibration operation.

The sum of the layer required resources of all the to-be-calibrated layers put into one group cannot be greater than the total available resources (otherwise, this calibration operation cannot be performed), but the sum of the layer required resources should be greater as much as possible on the basis of satisfying the requirement, such that the to-be-calibrated layers put into each group can make full use of the total available resources as much as possible to guarantee that the average number of the to-be-calibrated layers put into each group is as large as possible, i.e., the number of required groups (i.e., the number of calibration operations) is less.

The total resources may be all resources that the calibration apparatus has, that is, the total resources capable of being provided by the calibration apparatus in each calibration operation. Certainly, in different calibration operations, the resources (the total available resources) of the calibration apparatus are available for repeated use.

In the embodiment of the present invention, the layer attribute information (layer required resources) of each to-be-calibrated layer in a model is determined at first; and then the group in which the to-be-calibrated layer is located is determined according to the layer required resources of each of the to-be-calibrated layers and the total available resources, that is, the to-be-calibrated layer corresponding to each calibration operation is determined. By means of the technical above, all of to-be-calibrated layers can be reasonably grouped on the premise that the total available resources can provide support, so that the layer required resources in each calibration operation are balanced and large as much as possible, thereby making full use of resources. Moreover, the number of calibration operations may be reduced in most cases (the number of the groups may be reduced), and the calculation speed during the model calibration is increased.

Referring to FIG. 1, in some embodiments, after determining the group in which each of the to-be-calibrated layers is located according to the total available resources and the layer attribute information of each of the to-be-calibrated layers (S120), the calibration method further includes the following steps S130 to S140.

S130. One group that is not calibrated is selected, and all to-be-calibrated layers in the group are calibrated.

S140. If there are still groups that are not calibrated, the operation is returned to the step of selecting one group that is not calibrated, and calibrating all to-be-calibrated layers in the group.

After the grouping is determined, the calibration process can be started. In each calibration operation, the calibration is only performed on all to-be-calibrated layers in one group, and the to-be-calibrated layers in different groups are calibrated, respectively (i.e., a plurality of calibration operations).

As above, compared with the related technology for calibrating a predetermined sequence and a predetermined number of to-be-calibrated layers each time, in accordance with the way of the embodiment of the present invention, the resources of each calibration operation can be fully utilized as much as possible, that is, more to-be-calibrated layers are calibrated as much as possible in each calibration operation, such that the number of groups is less in most cases, that is, the number of calibrations is less and the total time required is less.

In some embodiments, the determining the group in which each of the to-be-calibrated layers is located according to the total available resources and the layer attribute information of each of the to-be-calibrated layers (S120) includes: determining the to-be-calibrated layer with the greatest layer required resources as a target layer from the to-be-calibrated layers not in a group; determining a group in which the target layer is located at least according to the layer attribute information of the target layer; subtracting the layer required resources of the target layer from the group available resources of the group in which the target layer is located; and if there are still to-be-calibrated layers not in a group, returning to the step of determining the to-be-calibrated layer with the greatest layer required resources as a target layer from the to-be-calibrated layers not in a group.

The "to-be-calibrated layers not in the group" refers to that, when the above steps are performed, the to-be-calibrated layer that has not been put into a certain group is the to-be-calibrated layer that has not been used as a target layer to be grouped as above.

Figure 2:
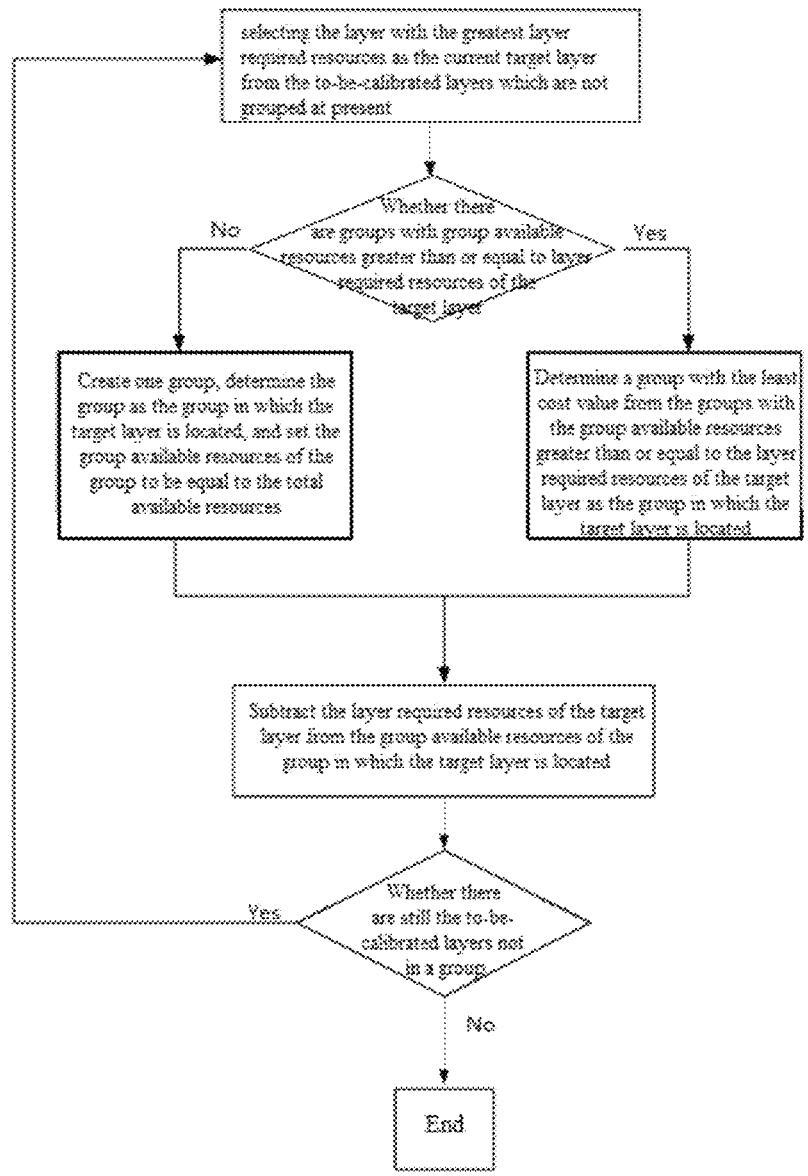
FIG. 2 is a schematic diagram of a process of determining of a group in which a to-be-calibrated layer is located in a calibration method in accordance with an embodiment of the present invention.

Referring to FIG. 2, the specific grouping process may include: from the to-be-calibrated layers which are not grouped at present, selecting the layer with the greatest layer required resources (e.g., the memory occupied in calibration operation) as the current target layer, grouping the target layer, and after grouping, subtracting the layer required resources of the target layer from the group available resources (i.e., the unoccupied resources corresponding to the group) of the group; and then determining whether there are the to-be-calibrated layers not in a group or not; if there are the to-be-calibrated layers not in a group, selecting the target layer from the ungrouped to-be-calibrated layers again (certainly, the previous target layer has been grouped and does not belong to the ungrouped to-be-calibrated layer any more), and if there is no the to-be-calibrated layer not in a group, ending the operation.

In some embodiments, the determining the group in which the target layer is located at least according to the layer attribute information of the target layer includes: if there are groups with the group available resources greater than or equal to the layer required resources of the target layer, selecting one of the groups as the group in which the target layer is located; and if there is no group with the group available resources greater than or equal to the layer required resources of the target layer, creating one group, determining the group as the group in which the target layer is located, and setting the group available resources of the group to be equal to the total available resources.

Referring to FIG. 2, the process of grouping each target layer may include: if there are one or more groups with the group available resources greater than the layer required resources of the target layer (i.e., there are groups capable of accommodating the target layer at present) in the current existing groups, putting the target layer into such a group (subsequently subtracting the layer required resources of the target layer from the group available resources); if there is no group with the group available resources greater than the layer required resources of the target layer (i.e. there is no group capable of accommodating the target layer at present), creating a new group (i.e. a calibration process is required to be added), and putting the target layer into the added group, and setting the value of the group available resources of the added group to be equal to the total available resources (subsequently subtracting the layer required resources of the target layer from the group available resources).

In some embodiments, the selecting one of the groups as the group in which the target layer is located if there are groups with the group available resources greater than or equal to the layer required resources of the target layer includes: determining a group with the least cost value from the groups with the group available resources greater than or equal to the layer required resources of the target layer as the group in which the target layer is located, wherein the cost value of any of the groups is a difference value between a first time and a second time of the group, the first time being the time required for calibrating all to-be-calibrated layers and the target layer in the group, and the second time being the time required for calibrating all the to-be-calibrated layers in the group.

Referring to FIG. 2, when there are groups capable of accommodating the target layer, the target layer can be put into the group with the least cost value (certainly, if there is only one group capable of accommodating the target layer, which must be the group with the least cost value).

The "cost value" of one group denotes the "increment" of the time for the calibration operation corresponding to the group after the target layer is put into the group relative to the time for the calibration operation corresponding to the group before the target layer is put into the group.

That is, when the target layer is to be put into the existing group, it should be guaranteed that the calibration operation time corresponding to the group is not prolonged or prolonged slightly after the target layer is put into the group, thus shortening the calibration time.

In some embodiments, the determining the group with the least cost value from the groups with the group available resources greater than or equal to the layer required resources of the target layer as the group in which the target layer is located includes: determining the maximum sequence number of each group; the maximum sequence number of any of the groups being the maximum value of the sequence numbers of all to-be-calibrated layers in the group, and the sequence number of any of the to-be-calibrated layers being the order of the to-be-calibrated layer in the model according to the preset processing sequence; if there are groups with the maximum sequence numbers greater than that of the target layer, selecting one of the groups as the group in which the target layer is located; and if there is no group with the maximum sequence number greater than that of the target layer, determining the group with the highest value of the maximum sequence number as the group in which the target layer is located.

The sequence number of the to-be-calibrated layer denotes the position of the to-be-calibrated layer in the model according to a preset data transmission direction, e.g., denoting that the to-be-calibrated layer is a first layer L1 (i.e., the sequence number is 1), a second layer L2 (i.e., the sequence number is 2), a third layer L3 (i.e., the sequence number is 3), and a fourth layer L4 (i.e., the sequence number is 4) in the model.

As a way of the embodiment of the present invention, the cost value of the group may be specifically determined according to the "sequence number". That is, if the maximum sequence number (the maximum sequence number of the group) of the existing to-be-calibrated layer in a part of the groups (the groups capable of accommodating the target layer of course) is greater than the sequence number of the target layer, the target layer is put into such as group. If the sequence numbers of the existing to-be-calibrated layers in the groups capable of accommodating the target layer are smaller than the sequence number of the target layer, the group with the highest value of the maximum sequence number is selected as the group in which the target layer is located.

During calibration, the typical data needs to be input to the apparatus in which the model is located to run the model, such that each to-be-calibrated layer can generate data for calibration, and the data is input to the calibration apparatus. If the to-be-calibrated layers corresponding to any one calibration operation are only a part of layers in the model, all the layers of the model do not need to be run during this calibration operation, and only the to-be-calibrated layer with the maximum sequence number corresponding to the calibration operation needs to be run (certainly, all the layers before the to-be-calibrated layer with the maximum sequence number need to be run regardless of calibration or not).

Therefore, if the sequence number of the target layer is smaller than the maximum sequence number of the to-be-calibrated layers in one group (i.e., the last layer needing to be run in the calibration operation of the group), after the target layer is put into the group, the model does not need to run more layers in the corresponding calibration operation, thus the running time of the model is not increased, that is, the actual time for the calibration operation is not increased, i.e., the cost value of the group is 0 (or close to 0).

Accordingly, if the sequence number of the target layer is greater than the maximum sequence number of any group, the target layer should be put into the group with the highest value of the maximum sequence number, thus guaranteeing that the number of the multi-running layers of the model in the corresponding calibration operation is the minimum after the target layer is put thereto, i.e., the cost value is the least.

Illustratively, the calibration method provided by the present invention may be abstracted as a bin packing problem.

For example, assuming that model has four layers L1, L2, L3, L4 arranged in sequence, all of which are to-be-calibrated layers, and the total memory of the calibration apparatus is 16G.

Each group (each calibration operation) corresponds to one bin, the total available resources (available resources for each calibration operation, such as the memory) is equivalent to the capacity of each bin (it may also be understood that the bin can be used repeatedly); while each to-be-calibrated layer is equivalent to a pile of sand, and its layer required resources (resources, such as memory, occupied by the to-be-calibrated layer in calibration operation) are equivalent to the amount of the sand. Whereas the process of grouping the to-be-calibrated layers is equivalent to loading each pile of sand into a corresponding bin, the remaining space of the bin (i.e., the group available resources, such as the memory) is reduced after each loading, and during the process, it should be ensured that the sand in each bin does not "spill" while making each bin full as much as possible, thus minimizing the total number of bins needed.

Therefore, the rule of loading the sand in the bin is as follows:

At first, the size of the memory required by each to-be-calibrated layer is determined (i.e., the size of each pile of sand is determined), and then, the bin with the least cost value is chosen from opened bins (i.e., the memory tolerable for a single calibration operation) according to the sequence of the memories from large to small so as to load each to-be-calibrated layer; or a new bin is opened when the opened bins cannot hold a certain to-be-calibrated layer.

The least cost value refers to that when the such to-be-calibrated layer is loaded into the bin again, the overall calculation duration of its corresponding calibration operation will not be prolonged or prolonged less. The calculation duration may be decided according to the sequence (sequence number) of data transmission in the model, for example, the calculation duration of the L4 is greater than that of the L3, the calculation duration of the L3 is longer than that of the L2, and the calculation duration of the L2 is longer than that of the L1. That is, according to the sequence of data transmission, the calculation duration of the later to-be-calibrated layer is greater than that of the front to-be-calibrated layer.

Illustratively, an execution subject of the calibration method provided by the present invention may be a calibration apparatus of a compiler, and the calibration method includes the following steps:

S1: the memory required by each layer of the L1 to the L4 is calculated, for example, the memories required by the L1, L2, L3 and L4 are 8G, 1G, 10G, and 0.5 G, respectively (i.e., the amount of the four piles of sand). It is determined that the available memory in each calibration operation is 16G (the capacity of each bin).

S2. Various to-be-calibrated layers are sorted according to the memories from large to small, that is L3-L1-L2-L4.

S3. The L3 is to be loaded (the loading is performed according to the memories from large to small): as there is no bin at the moment, the first bin is opened, and the L3 is placed into the first bin, and the first bin has 6G remaining.

S4. The L1 is to be loaded: as the first bin has 6G remaining after the L3 is loaded therein, it is impossible to accommodate the L1 (8G), thus a second bin is opened, and the L1 is placed into the second bin, and the second bin has 8G remaining.

S5. The L2 is to be loaded: as it is found that the both bins can accommodate the L2 after traversing the two opened bins, the cost value for loading needs to be calculated, the L3 which has been loaded into the first bin is located behind the L2, such that after the L2 is loaded into the first bin, the calculation duration will not be prolonged, that is, the cost value is 0; while the L1 which has been loaded in the second bin is located in front of the L2, after the L2 is loaded into the second bin, the calculation duration will become the calculation duration of the L2, making the cost value higher; and therefore, the L2 is loaded into the first bin, and the first bin has 5G remaining.

S6. The L4 is to be loaded: similarly, the both bins may accommodate the L4, moreover, after the L4 is placed into the first bin, the cost value changes from the calculation duration of L3 (the second time) to the calculation duration of the L4 (the first time), such cost value is smaller than the cost value for loading the L4 into the second bin (which changes from the calculation duration of L2 to the calculation duration of the L4); and therefore, the L4 is loaded into the first bin, and the first bin has 4.5G remaining.

S7. The to-be-calibrated layers in various bins are calibrated in sequence by taking the bin as a unit, for example, the L2, L3 and L4 in the first bin are calibrated in the first calibration operation, and the L1 in the first bin is calibrated in the second calibration operation, thus determining corresponding quantization factors.

Figure 3:
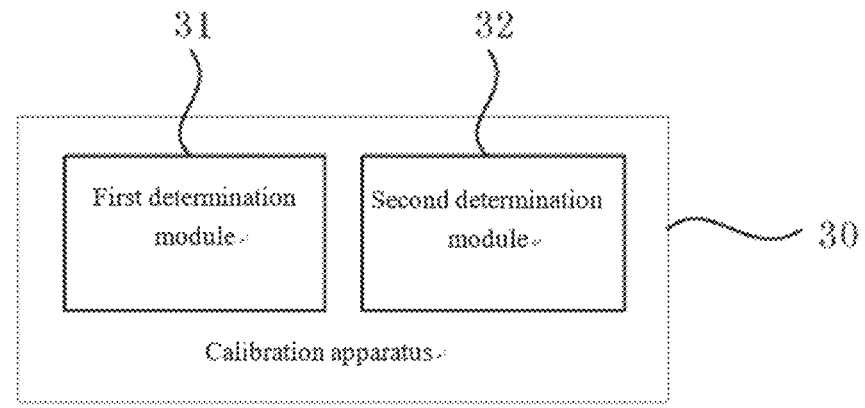
FIG. 3 is a structure diagram of a calibration apparatus in accordance with the embodiment of the present invention.

In a second aspect, as shown in FIG. 3, the embodiment of the present invention provides a calibration apparatus 30. The apparatus 30 may be applicable to the condition of calibrating to-be-calibrated layers in a model. The apparatus 30 may be implemented with software and/or hardware, and is generally integrated on the terminal device.

The apparatus 30 includes:
- a first determination module 31, configured to determine layer attribute information of each to-be-calibrated layer in a model; and
- a second determination module 32, configured to determine a group in which each of the to-be-calibrated layers is located according to the total available resources and the layer attribute information of each of the to-be-calibrated layers.

The calibration apparatus 30 in accordance with the embodiment of the present invention may implement any of the calibration methods in the embodiments of the present invention.

In some embodiments, the determining a group in which each of the to-be-calibrated layers is located according to the total available resources and the layer attribute information of each of the to-be-calibrated layers includes: determining the to-be-calibrated layer with the greatest layer required resources as a target layer from the to-be-calibrated layers not in a group; determining a group in which the target layer is located at least according to the layer attribute information of the target layer; subtracting the layer required resources of the target layer from the group available resources of the group in which the target layer is located; and if there are still to-be-calibrated layers not in a group, returning to the step of determining the to-be-calibrated layer with the greatest layer required resources as a target layer from the to-be-calibrated layers not in a group.

In some embodiments, the determining the group in which the target layer is located at least according to the layer attribute information of the target layer includes: if there are groups with the group available resources greater than or equal to the layer required resources of the target layer, selecting one of the groups as the group in which the target layer is located; if there is no group with the group available resources greater than or equal to the layer required resources of the target layer, creating one group, determining the group as the group in which the target layer is located, and setting the group available resources of the group to be equal to the total available resources.

In some embodiments, the selecting one of the groups as the group in which the target layer is located if there are groups with the group available resources greater than or equal to the layer required resources of the target layer includes: determining a group with the least cost value from the groups with the group available resources greater than or equal to the layer required resources of the target layer as the group in which the target layer is located, wherein the cost value of any of the groups is a difference value between a first time and a second time of the group, the first time being the time required for calibrating all to-be-calibrated layers and the target layer in the group, and the second time being the time required for calibrating all the to-be-calibrated layers in the group.

In some embodiments, the determining the group with the least cost value from the groups with the group available resources greater than or equal to the layer required resources of the target layer as the group in which the target layer is located includes: determining the maximum sequence number of each group; the maximum sequence number of any of the groups being the maximum value of the sequence numbers of all to-be-calibrated layers in the group, and the sequence number of any of the to-be-calibrated layers being the order of the to-be-calibrated layer in the model according to the preset processing sequence; if there are groups with the maximum sequence numbers greater than that of the target layer, selecting one of the groups as the group in which the target layer is located; and if there is no group with the maximum sequence number greater than that of the target layer, determining the group with the highest value of the maximum sequence number as the group in which the target layer is located.

In some embodiments, the resources are memory resources.

In some embodiments, after determining the group in which each of the to-be-calibrated layers is located according to the total available resources and the layer attribute information of each of the to-be-calibrated layers, the method further includes: selecting one group that is not calibrated, and calibrating all to-be-calibrated layers in the group; if there are still groups that are not calibrated, returning to the step of selecting one of groups that is not calibrated, and calibrating all to-be-calibrated layers in the group.

Figure 4:
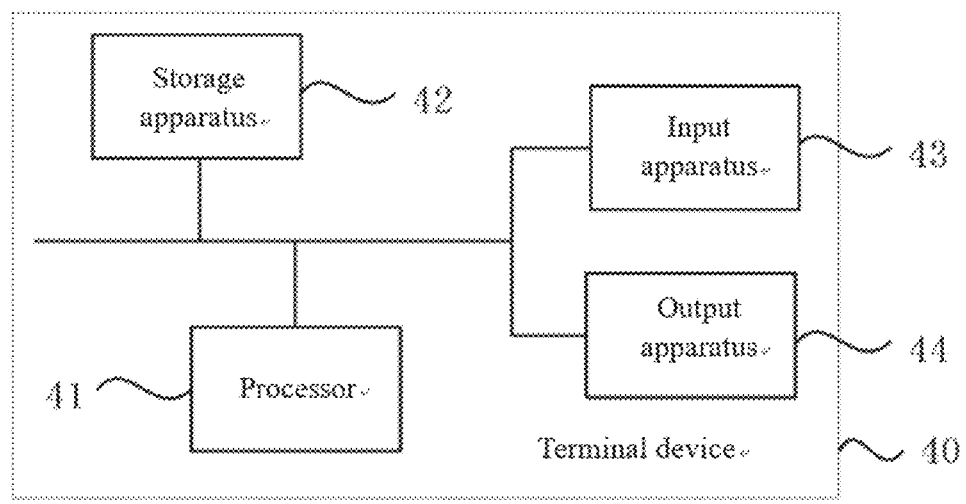
FIG. 4 is a structure diagram of a terminal device in accordance with the embodiment of the present invention.

In a third aspect, referring to FIG. 4, the embodiment of the present invention provides a terminal device 40.

The terminal device 40 includes: one or more processors 41 (one processor 41 is taken as an example in FIG. 4), and a storage apparatus 42. The storage apparatus 42 is configured to store one or more programs. The one or more programs, when executed by the one or more processors 41, enable the one or more processors 41 to implement any of the calibration methods provided by the embodiments of the present invention.

The terminal device 40 may also include an input apparatus 43 and an output apparatus 44.

The processor 41, the storage apparatus 42, the input apparatus 43 and the output apparatus 44 in the terminal device 40 may be connected via a bus or in other forms. The connection via a bus is taken as an example in FIG. 4.

The storage apparatus 42 in the terminal device 40 serves as a computer readable storage medium and can be configured to store one or more programs. The programs may be software programs, computer executable programs and modules, such as program instructions/modules (e.g., modules in the calibration apparatus 30 shown in FIG. 3, including a first determination module 31 and a second determination module 32) corresponding to the calibration method provided by the embodiment of the present invention. The processor 41, by running software programs, instructions, and modules stored in the storage apparatus 42, executes various functional applications and data processing of the terminal device 40, i.e., implementing the calibration method in the above method embodiment.

The storage apparatus 42 may include a program storage area and a data storage area, where the program storage area may store an operating system, and an application program required by at least one function; and the data storage area may store data created according to the use of the terminal device 40, and the like. In addition, the storage apparatus 42 may include a high-speed random-access memory and may also include non-volatile memory, such as at least one magnetic disk storage device, flash memory device, or other non-volatile solid-state storage device. In some instances, the storage apparatus 42 may further include memories remotely arranged with respect to the processor 41, and these memories may be connected to the device via a network. The instances of the networks include, but are not limited to, the Internet, the Intranets, local area networks, mobile communication networks, and combinations thereof.

The input apparatus 43 may be configured to receive input digital or character information, and generate key signal inputs related to the user setting as well function control of the terminal device 40. The output apparatus 44 may include display devices such as display screens.

Figure 5:
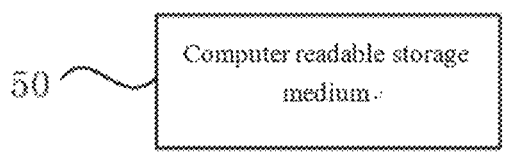
FIG. 5 is a structure diagram of a computer readable storage medium in accordance with the embodiment of the present invention.

In a fourth aspect, referring to FIG. 5, the embodiment of the present invention provides a computer readable storage medium 50 having computer programs stored thereon. The computer programs, when executed by the processors, are configured to execute any of the calibration methods provided by the embodiments of the present invention.

The computer storage medium in accordance with the embodiment of the present invention may employ any combination of one or more computer readable media. The computer readable medium may be a computer readable signal medium or a computer readable storage medium 50. The computer readable storage medium 50, for example, may be, but is not limited to, electronic, magnetic, optical, electromagnetic, infrared, or semiconductor systems, apparatuses, or devices, or any combination of the foregoing. More specific examples (a non-exhaustive list) of a computer-readable storage medium 50 may include the following: an electrical connection having one or more wires, a portable computer disk, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. The computer-readable storage medium 50 may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may employ any of a variety of forms, including, but not limited to, electromagnetic signals, optical signals, or any suitable combination thereof. A computer-readable signal medium may be any computer-readable medium other than the computer-readable storage medium 50, which may communicate, propagate, or transport a program for use by or in connection with an instruction execution system, apparatus, or device.

Program code embodied on the computer-readable medium may be transmitted using any appropriate medium, including, but not limited to, wireless, electric wire, optical fiber cable, radio frequency (RF), etc., or any suitable combination of the foregoing.

Computer program code for executing operations for aspects of the present invention may be written in any combination of one or more programming languages, including an object-oriented programming language such as Java, Smalltalk, C++ or the like and conventional procedural programming languages, such as the "C" programming language or similar programming languages. The program code may be executed entirely on a user's computer, partly on the user's computer, as a stand-alone software package, partly on the user's computer and partly on a remote computer or entirely on the remote computer or server. In the scenario where a remote computer is involved, the remote computer may be connected to the user's computer through any type of network, including a local area network (LAN) or a wide area network (WAN), or may be connected to an external computer (for example, through the Internet using an Internet Service Provider).

It should be noted that the foregoing are merely preferred embodiments of the present invention and the applied technical principles. It should be appreciated by those skilled in this art that the present invention is not limited to the particular embodiments described herein, and various apparent alterations, rearrangements and substitutions may be made without departing from the protection scope of the present invention. Therefore, although the present invention is described in detail with reference to the above embodiments, the present invention is not limited to those embodiments, and other equivalent embodiments can be included without departing from the scope of the present invention which is defined by the appended claims.

The invention claimed is:

1. A calibration method for a neural network model, comprising:
   determining layer attribute information of each to-be-calibrated layer in a model; and
   determining a group to which each of the to-be-calibrated layers is assigned according to the total available resources and the layer attribute information of each of the to-be-calibrated layers;
   wherein the layer attribute information of any of the to-be-calibrated layers comprises layer required resources, the layer required resources being resources needing to be occupied when the to-be-calibrated layer is calibrated; and the total available resources are the total resources used for calibration, wherein the resources are memory resources; and
   wherein the determining a group to which each of the to-be-calibrated layers is assigned according to the total available resources and the layer attribute information of each of the to-be-calibrated layers comprises:
   determining the to-be-calibrated layer with the greatest layer required resources as a target layer from the to-be-calibrated layers not in a group;
   determining a group to which the target layer is assigned at least according to the layer attribute information of the target layer;
   subtracting the layer required resources for the target layer from the group available resources of the group to which the target layer is assigned; and
   if there are still to-be-calibrated layers not in a group, returning to the step of determining the to-be-calibrated layer with the greatest layer required resources as a target layer from the to-be-calibrated layers not in a group.

2. The method according to claim 1, wherein the determining the group to which the target layer is assigned at least according to the layer attribute information of the target layer comprises:
   if there are groups with the group available resources greater than or equal to the layer required resources of the target layer, selecting one of the groups as the group to which the target layer is assigned;
   if there is no group with the group available resources greater than or equal to the layer required resources of the target layer, creating one group, determining the group as the group to which the target layer is assigned, and setting the group available resources of the group to be equal to the total available resources.

3. The method according to claim 2, wherein the selecting one of the groups as the group to which the target layer is assigned if there are groups with the group available resources greater than or equal to the layer required resources of the target layer comprises:
   determining a group with the least cost value from the groups with the group available resources greater than or equal to the layer required resources of the target layer as the group to which the target layer is assigned,
   wherein the cost value of any of the groups is a difference value between a first time and a second time of the group, the first time being the time required for calibrating all to-be-calibrated layers and the target layer in the group, and the second time being the time required for calibrating all the to-be-calibrated layers in the group.

4. The method according to claim 3, wherein the determining a group with the least cost value from the groups with the group available resources greater than or equal to the layer required resources of the target layer as the group to which the target layer is assigned comprises:
   determining the maximum sequence number of each group; the maximum sequence number of any of the groups being the maximum value of the sequence numbers of all to-be-calibrated layers in the group, and the sequence number of any of the to-be-calibrated layers being the order of the to-be-calibrated layer in the model according to the preset processing sequence;
   if there are groups with the maximum sequence numbers greater than that of the target layer, selecting one of the groups as the group to which the target layer is assigned; and
   if there is no group with the maximum sequence number greater than that of the target layer, determining the group with the highest value of the maximum sequence number as the group to which the target layer is assigned.

5. The method according to claim 1, wherein, after determining the group to which each of the to-be-calibrated layers is assigned according to the total available resources and the layer attribute information of each of the to-be-calibrated layers, the method further comprises:

selecting one group that is not calibrated, and calibrating all to-be-calibrated layers in the group; and if there are still groups that are not calibrated, returning to the step of selecting one of groups that is not calibrated, and calibrating all to-be-calibrated layers in the group.

6. A terminal device, comprising:

one or more processors;

a storage apparatus, configured to store one or more programs;

wherein the one or more programs, when executed by the one or more processors, enable the one or more processors to implement the method according to claim 1.

7. A computer readable storage medium having computer programs stored thereon, wherein the computer programs, when executed by the processors, are configured to implement the method according to claim 1.

* * * * *